United States Patent

[11] 3,540,552

| [72] | Inventor | Edmund Eich |
| | | Coburg, Bavaria, Germany |
| [21] | Appl. No. | 759,175 |
| [22] | Filed | Sept. 11, 1968 |
| [45] | Patented | Nov. 17, 1970 |
| [73] | Assignee | Werkzeugmaschinenfabrik Adolf Waldrich Coburg, |
| | | Coburg/Bavaria, Germany |
| [32] | Priority | Sept. 15, 1967 |
| [33] | | Germany |
| [31] | | No. 1,627,043 |

[54] DEVICE FOR CLAMPING TOGETHER TWO MACHINE PARTS, DISPLACEABLE RELATIVE TO EACH OTHER, PARTICULARLY OF WORK TOOL MACHINES
10 Claims, 4 Drawing Figs.

[52] U.S. Cl. .................................................. 188/77,
74/99, 74/110, 90/11, 269/47, 279/2
[51] Int. Cl. .................................................. F16d 51/04
[50] Field of Search .......................................... 188/74, 77,
82.8, 170; 74/99, 104, 107, 110; 192/45.1 (Inquired);
279/2; 269/47, 52; 90/11.1; 72/315

[56] References Cited
UNITED STATES PATENTS

| 151,432 | 6/1874 | Ferren .......................... | 269/47X |
| 1,825,081 | 12/1931 | McKay .......................... | 279/2UX |
| 2,082,345 | 6/1937 | Lasser .......................... | 279/2UX |
| 2,870,890 | 1/1959 | Cobb ............................ | 192/45.1 |
| 2,954,855 | 10/1960 | Lund ............................ | 192/45.1 |
| 3,260,331 | 7/1966 | Borman ........................ | 188/170X |
| 3,263,778 | 8/1966 | Pfeiffer ........................ | 188/170X |

Primary Examiner—George E. A. Halvosa
Attorney—Woodhams, Blanchard and Flynn

ABSTRACT: A device for clamping together two machine parts including a displaceable control member and a clamping plate. A series of spring-loaded, rotatable inclined clamping pieces engage the control member at one end thereof and the clamping plate at the other end thereof. Displacement of the control member causes the obliquity of the clamping pieces relative to the control member and the clamping plate to be reduced and a clamping pressure is exerted by forcing the control member and clamping plate apart.

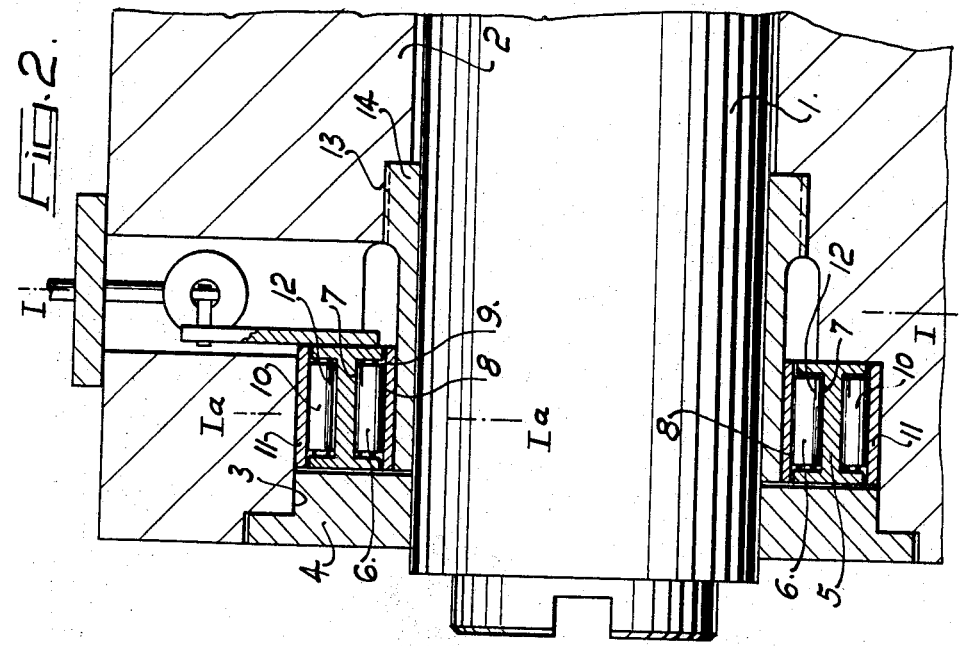
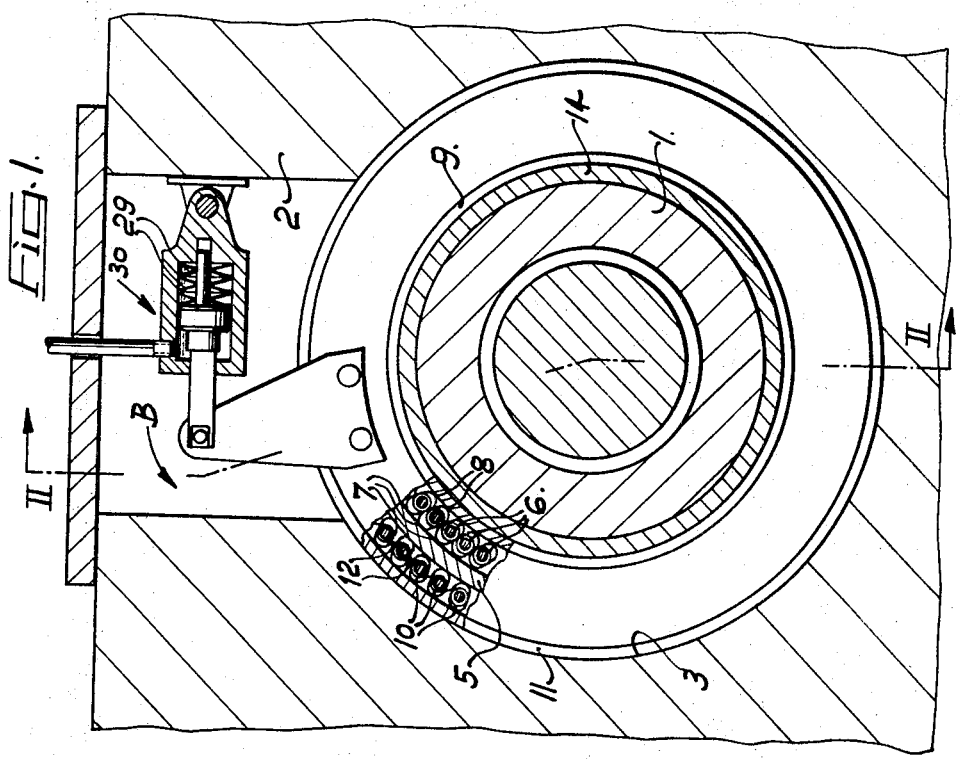

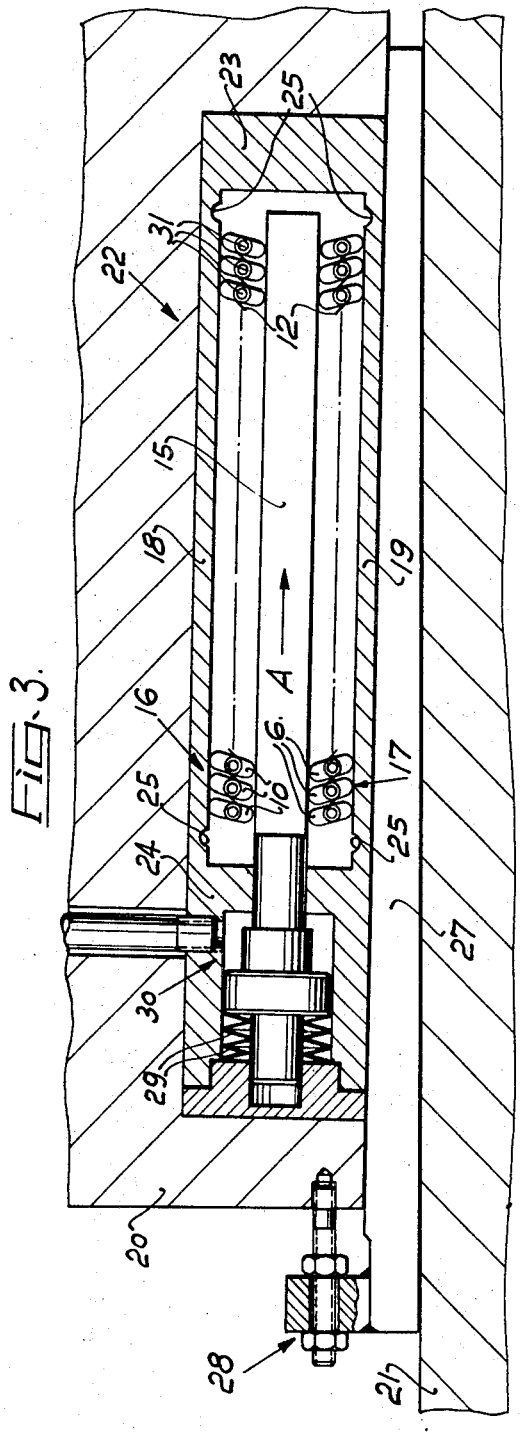
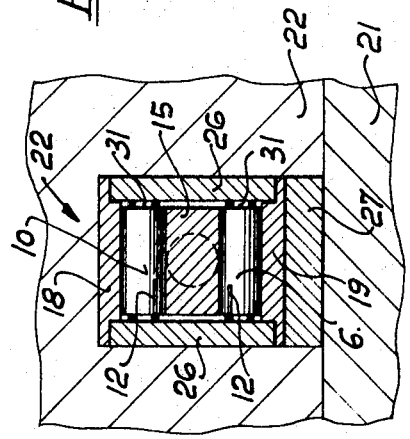

DEVICE FOR CLAMPING TOGETHER TWO MACHINE PARTS, DISPLACEABLE RELATIVE TO EACH OTHER, PARTICULARLY OF WORK TOOL MACHINES

The invention relates to a device for clamping together two machine parts, displaceable relative to each other, more particularly of machine tools, by means of a displaceable control member, which is mounted on the first machine part and against which a row of spring-loaded, rotatable, inclined clamping pieces engage at one end, while the other ends of the said clamping pieces engage against a clamping plate, acting on the second machine part, and by displacement of the control member for clamping, the clamping pieces are also carried along and their obliquity relative to the control member and clamping plate, respectively, is reduced.

A device of this kind is known for clamping a spindle sleeve in a spindle-sleeve housing, in which the control tongue slides on the first machine part, that is to say, the spindle sleeve housing. Owing to the sliding friction between the control tongue and the first machine part a very considerable actuating force is necessary, since in the clamping process, the frictional resistance on the control tongue increases with increasing clamping force. The ratio between the resulting clamping force and the actuating force employed is comparatively small, and the efficiency of this known device is correspondingly low. It is to be regarded as a further disadvantage that the high frictional forces occuring between the control tongue and the first machine part or the spindle sleeve housing result in very considerable wear.

The problem underlying the invention is to provide a device for clamping together two machine parts slidable relative to each other, more particularly of machine tools, whereby a very great clamping force may be obtained with a comparatively small actuating force, as well as long life, owing to the low friction.

This problem is solved according to the invention in that a row of antifriction elements are arranged between the side of the control tongue remote from the clamping pieces and the first machine part. Consequently, instead of sliding friction between the control tongue and the first machine part, there is only rolling friction, which is less than the sliding friction. For the same actuating force, therefore, a considerably greater clamping force may be obtained than with the described known device.

Preferably, the antifriction elements consist of a row of spring-loaded clamping pieces, arranged in mirror-image fashion relative to the first clamping pieces. Advantageously, the clamping pieces used will be those of commercial type with convex ends, such as are used in clamping block freewheel devices. The arrangement of a second mirror-image row of these clamping pieces has the advantage that for the same sliding distance of the control tongue, a spread distance twice as great, and a correspondingly greater clamping force are obtained, owing to toggle-lever action.

For clamping a spindle sleeve, the control tongue and the clamping plate of the device according to the invention are constructed in the form of concentric rings, between which the clamping pieces are arranged annularly. The device according to the invention may, however, be constructed for clamping, for example, working tables sliding on a guide or also for clamping slides or rests. In such a device according to the invention, the control tongue is of rod-shape construction and the rows of antifriction elements and clamping pieces are arranged parallel to the control tongue between the latter and two plane clamping plates.

It is self-evident that there is provided in one of the machine parts to be clamped together a recess corresponding to the form of the device according to the invention, i.e., annular or rod-shaped, for mounting the said device.

The invention is described more particularly in the following with reference to the embodiment examples represented in the drawings, in which:

FIG. 1 shows a section through a device according to the invention for clamping a spindle sleeve in a spindle-sleeve housing, along the lines I–I and Ia–Ia in FIG. 2, FIG. 2 shows a section along the line II–II in FIG. 1,
FIG. 3 shows a further embodiment example in section,
FIG. 4 shows a section on the line IV–IV in FIG. 3.

FIGS. 1 and 2 show a spindle sleeve 1 in a spindle-sleeve housing 2. An annular recess 3 is provided in the spindle-sleeve housing 2 for accommodating a device for clamping the spindle sleeve in the spindle-sleeve housing. This recess is adapted to be closed on the end face by a cover 4. The device arranged in the annular recess 3 consists of a displaceable control ring 5 against which a row of spring-loaded, rotatable, inclined clamping pieces 6 engage with one end 7 in each case, while the other end 8 of each clamping piece engages on a clamping plate 9 acting on the spindle sleeve 1. The control member 5 and clamping plate 9 are here constructed as concentric rings, while the clamping pieces 6 are arranged annularly.

According to the invention, a row of antifriction elements is arranged between the side of the control tongue 5 remote from the clamping pieces 6 and the first machine part, that is, in FIGS. 1 and 2, the housing 2. Advantageously, these antifriction elements consist of a row of spring-loaded clamping pieces 10 arranged in mirror-image fashion relative to the clamping pieces 6. Appropriately, these clamping pieces 10 do not engage directly with the spindle-sleeve housing 2 but by means of a second clamping-plate 11. The springs of the clamping pieces 6 and 10 are denoted by 12. The control tongue 5, in the present case in the form of a control ring, is here advantageously constructed as a double channel-section cage. This construction provides a particularly good mounting of the clamping pieces and at the same time good protection against dirt; on the other hand, it increases the stability of the control ring.

As will be gathered more particularly from FIG. 2, between the clamping ring 9 and the spindle sleeve 1 there is provided a bush 14 of softer material than the material of the spindle-sleeve, and connected to the spindle-sleeve housing 2 for example by means of a screwthread 13. In this way, marking or grooving of the spindle sleeve 1 is prevented.

Finally, in the embodiment example according to FIGS. 3 and 4, the control tongue 15 is rod-shaped. The rows of antifriction elements or clamping pieces 16 and 17 are here arranged parallel to the control tongue between the latter and two plane clamping plates 18 and 19. In this case, the first machine part is denoted by 20 and the second by 21. In the embodiment according to FIGS. 3 and 4 and also in the spindle sleeve clamping means according to FIGS. 1 and 2 already described, if desired, cylindrical rollers or rows of balls could be used as antifriction elements 16 or antifriction elements 10. The advantageous toggle-lever action is obtained, however, only if, as already stated, the antifriction elements consist of a row of spring-loaded clamping pieces 10 arranged in mirror-image fashion to the first clamping pieces.

As may be appreciated from FIGS. 3 and 4, the clamping plates 18 and 19 appropriately form the two opposite side walls of a housing 22, open at its adjoining sides. Advantageously, grooves 25, reducing the cross section, are provided between the clamping plates 18 and 19 and the adjoining housing parts 23 and 24. This step increases the yieldability of the clamping plates 18 and 19, so that less force is required to press apart the clamping plates 18 and 19 on sliding of the control tongue in the direction of the arrow A.

The open sides of the housing 22 are appropriately closed by cover plates 26, which adjoin the clamping plates 18 and 19 loosely. These cover plates prevent the entry of dirt and sliding out of the clamping pieces 6 and 10, without preventing the movement of the clamping plates.

For compensating possible large tolerances between the machine parts 20 and 21, a wedge-shaped adjusting strip 27 is advantageously arranged between the clamping plate 19 and the second machine part 21. The adjusting device is shown at 28.

In both embodiment examples, the control tongues 5 and 15 are held in the clamping position by means of spring pressure, in the present case plate springs 29, and are pushed into the released position hydraulically by means of the piston-cylinder arrangement 30. Apart from mechanical and hydraulic actuating means, however, pneumatic and electrical actuating means of various constructions are possible. In the spindle sleeve clamping means shown in FIG. 1 the plate springs 29 force the control tongue 5 into the clamping position in the direction of the arrow B, the clamping pieces 6 and 10 being carried along and their obliquity relative to the control tongue and the clamping plates 9 and 11 being reduced. The clamping pieces are always held prestressed by the springs 12. To prevent the springs 12 from sliding off the clamping pieces 6 and 10, the clamping pieces have small stub axles 31. The embodiment examples shown are identical with respect to control and movement of the clamping pieces.

The device according to the invention as shown in FIGS. 1 and 2 may also be used advantageously in another respect, *i.e.*, for clamping ball bearings. As is known, in ball bearings or other antifriction bearings used for mounting shafts with high accuracy, difficulties arise owing to the fact that at very low speeds, lesser bearing play is necessary, and at high speeds a greater bearing play is necessary to prevent inadmissible heating. If the outer race and possibly also the inner race of the ball bearing are made suitably thin, then by providing the device according to the invention the bearing play may be adapted to the particular conditions. Also the considerable bearing play resulting from wear may be compensated in this way.

I claim:

1. A device for clamping together two fixedly spaced machine parts, comprising:
    a movable control member disposed between the two spaced machine parts;
    first clamping plate means supported for movement into and out of clamping engagement with the one machine part;
    a plurality of normally inclined first clamping pieces and resilient means for biasing the first clamping pieces toward a minimum normally inclined position, the first clamping pieces extending between and engaging the movable control member and the first clamping means but with insufficient force to effect a clamping engagement between the first clamping plate means and the one machine part;
    second clamping plate means supported for movement into and out of clamping engagement with the other machine part;
    a plurality of normally inclined second clamping pieces and resilient means for biasing the second clamping pieces toward a minimum normally inclined position, the second clamping pieces extending between and engaging the movable control member and the second clamping plate means but with insufficient force to effect a clamping engagement between the second clamping plate means and the other machine part, the normal inclined position of the second clamping pieces being opposite to that of the first clamping pieces;
    whereby upon a movement of the control member relative to the clamping plate means, a frictional engagement will occur between the clamping pieces and the control member and the clamping plate means to effect an increase in the inclination of the plurality of the first and second clamping pieces relative to the first and second clamping plate means and the movable control member against the urging of the resilient means to force the first and second clamping plate means away from the movable control means to effect a clamping engagement of the clamping plate means with the spaced apart machine parts.

2. The device defined in claim 1 including a hydraulic piston and cylinder, the piston being connected to the control member, resilient means urging the piston and control member in a direction to normally clamp the two machine parts together.

3. The device defined in claim 1, wherein the two machine parts are a spindle sleeve and a housing wherein the control member and the clamping plate means are constructed as concentric rings and the first clamping pieces are arranged annularly between the control member and the first clamping plate means and the second clamping pieces are arranged annularly between the control member and the second clamping plate means.

4. The device defined in claim 3, wherein the control member has a double channel section, the first clamping pieces being located in an inwardly-facing annular channel on the control member and the second clamping pieces being located in an outwardly-facing annular channel on the control member.

5. The device defined in claim 3, including a bush connected to the housing and comprised of a softer material than the spindle sleeve, the bush being disposed between the spindle sleeve and one of the clamping plate means.

6. The device defined in claim 1, wherein the first and second clamping plate means are planar plates; and wherein the control member is a rod and the first and second clamping pieces are arranged in rows parallel to the control rod between the rod and the two planar plates.

7. The device defined in claim 6, wherein the planar clamping plates form two opposite side walls of a housing open on the two adjoining sides.

8. The device defined in claim 7 7, the clamping plates have portions of reduced thickness to increase the flexibility thereof.

9. The device defined in claim 7, wherein the open sides are closed by cover plates loosely adjoining the clamping plates.

10. The device defined in claim 7, including a wedge-shaped adjusting strip between the clamping plate and one of the machine parts.